(12) United States Patent
Liang et al.

(10) Patent No.: US 10,867,761 B1
(45) Date of Patent: Dec. 15, 2020

(54) SCISSOR MECHANISM AND KEYSWITCH

(71) Applicant: LITE-ON Technology (Chang Zhou) Co., LTD., Jiangsu Province (CN)

(72) Inventors: XiaoQiang Liang, Jiangsu Province (CN); Lei Shi, Jiangsu Province (CN); XueLei Liu, Jiangsu Province (CN)

(73) Assignee: LITE-ON TECHNOLOGY (CHANG ZHOU) CO., LTD., Jiangsu (CN)

( * ) Notice: Subject to any disclaimer, the term of this patent is extended or adjusted under 35 U.S.C. 154(b) by 0 days.

(21) Appl. No.: 16/796,835

(22) Filed: Feb. 20, 2020

(30) Foreign Application Priority Data

Jul. 29, 2019 (CN) .......................... 2019 1 0688739

(51) Int. Cl.
| H01H 13/705 | (2006.01) |
| H01H 13/7065 | (2006.01) |
| G06F 3/02 | (2006.01) |
| H01H 3/12 | (2006.01) |
| H01H 13/88 | (2006.01) |

(52) U.S. Cl.
CPC ....... H01H 13/7065 (2013.01); G06F 3/0202 (2013.01); H01H 3/125 (2013.01); H01H 13/88 (2013.01)

(58) Field of Classification Search
CPC .... H01H 13/14; H01H 3/125; H01H 13/7065; H01H 13/705; H01H 13/70; H01H 13/52; H01H 13/85; H01H 13/84
See application file for complete search history.

(56) References Cited

U.S. PATENT DOCUMENTS

| 5,562,203 | A | * | 10/1996 | Mochizuki | ............. | H01H 3/125 |
| | | | | | | 200/341 |
| 2017/0191612 | A1 | * | 7/2017 | Yen | .................. | F16M 13/02 |
| 2018/0075987 | A1 | * | 3/2018 | Tsai | ..................... | H01H 3/12 |
| 2018/0358193 | A1 | * | 12/2018 | Chen | ..................... | H01H 13/88 |

* cited by examiner

*Primary Examiner* — Ahmed M Saeed
(74) *Attorney, Agent, or Firm* — Umberg Zipser LLP

(57) ABSTRACT

The present disclosure discloses a scissor mechanism and a keyswitch. The scissor mechanism comprises an inner arm and an outer arm. Two opposite first side surfaces of the inner arm respectively comprise a first connecting part. Two opposite second side surfaces of the outer arm respectively comprise a second connecting part. The inner arm is disposed within the outer arm. The first connecting parts are pivotally connected to the corresponding second connecting parts. An anti-frictional configuration is disposed between each first side surface of the inner arm and the corresponding each second side surface of the outer arm. The anti-frictional configurations are provided with smooth contact surfaces without any burrs or parting lines by angle lifting demolding techniques. The present disclosure also discloses a keyswitch. When pressing and releasing the keyswitch, the noise can be reduced by the anti-frictional configurations when the inner arm and the outer arm pivot.

5 Claims, 11 Drawing Sheets

SCISSOR MECHANISM AND KEYSWITCH

This application claims the priority benefit of Chinese Patent Application Serial Number CN201910688739.9, filed on Jul. 29, 2019, the full disclosure of which is incorporated herein by reference.

BACKGROUND

Technical Field

The present disclosure relates to the technical field of keyswitches, and more particularly to a scissor mechanism and a keyswitch comprising the scissor mechanism.

Related Art

The scissor mechanism is one of the commonly used support mechanisms for supporting and positioning a keycap in a keyswitch of a computer keyboard. An inner arm pivotally connected to an outer arm constitutes a scissor mechanism, They will pivot relative to each other when the keyswitch is being pressed or released. Most of the conventional scissor mechanisms are manufactured by means of mold injection. However, the burrs on the side of the scissor mechanism co-produced from the injection molding results in noise from rubbing of burrs or joint lines of the outer side of the inner arm and the inner side of the outer arm, affecting the experience for users.

SUMMARY

The present disclosure provides a scissor mechanism to solve the noise from the rubbing of the contacting surfaces of an inner arm and an outer arm within the mechanism when pivoting.

One embodiment provides a scissor mechanism comprising an inner arm, in which two opposite first side surfaces respectively comprise a first connecting part; and an outer arm, in which two opposite second side surfaces respectively comprise a second connecting part. The inner arm is disposed within the outer arm, and the first connecting part is pivotally connected to the corresponding second connecting part. wherein an anti-frictional configuration is disposed between each of the two first side surfaces of the inner arm and each of the two second side surfaces of the outer arm corresponding to each of the first side surfaces of the inner arm.

A keyswitch comprising a baseplate, a keycap and a scissor mechanism as described above. The keycap is disposed on the baseplate and the scissor mechanism is disposed between the baseplate and the keycap, wherein the top end of the scissor mechanism connects to the keycap and the bottom end of the scissor mechanism connects to the baseplate, so that the keycap is able to move up and down relative to the baseplate.

The noise from the pivotally rubbing of the inner and the outer arms of the scissor mechanism of the present disclosure might be reduced by the anti-frictional configuration disposed between the said arms.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
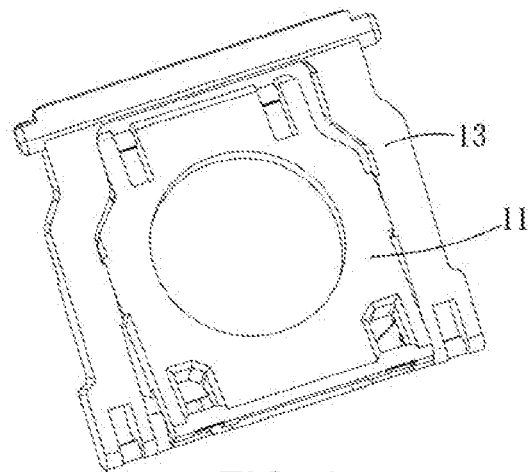
FIG. 1 is a perspective view of the first embodiment of the scissor mechanism of the present disclosure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only include these elements, but also includes other elements not specified expressly, or may include inherent elements of the process, method, object, or device. If no more limitations are made, an element limited by "include a/an" does not exclude other same elements existing in the process, the method, the article, or the device which includes the element.

In the following embodiment, the same reference numerals are used to refer to the same or similar elements throughout the invention.

Figure 2:
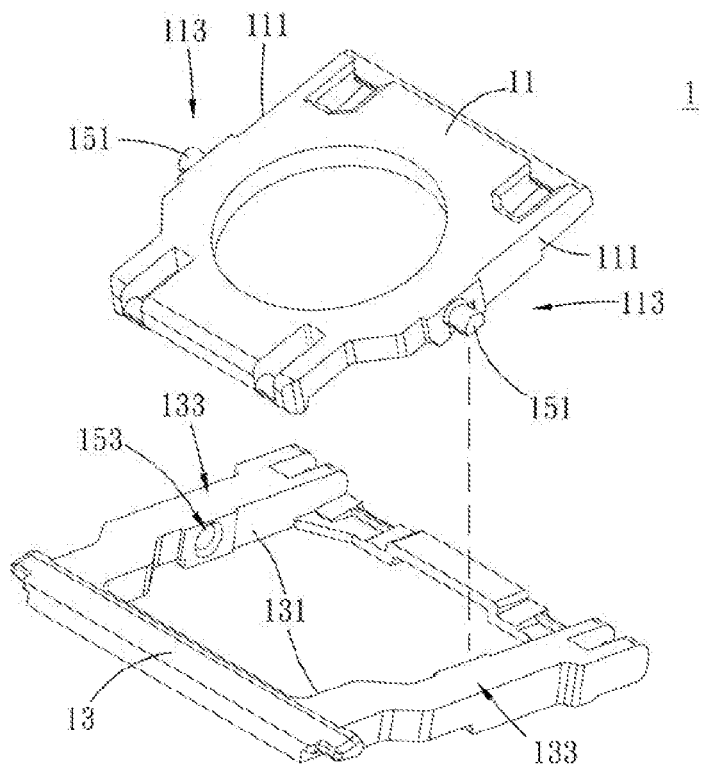
FIG. 2 is an exploded view of the first embodiment of the scissor mechanism of the present disclosure.

FIG. 1 and FIG. 2 are a perspective view and an exploded view of the first embodiment of the scissor mechanism of the present disclosure. The present disclosure provides a scissor mechanism 1 disposed between the baseplate and keycap which is a support for lifting inside a keyswitch. The scissor mechanism 1 comprises an inner arm 11 and an outer arm 13.

Figure 3:
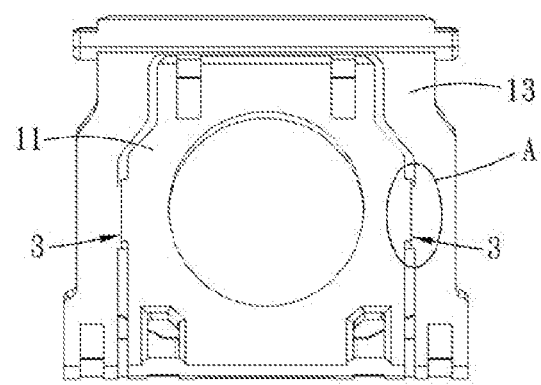
FIG. 3 is a side view of the first embodiment of the scissor mechanism of the present disclosure.
Figure 4:
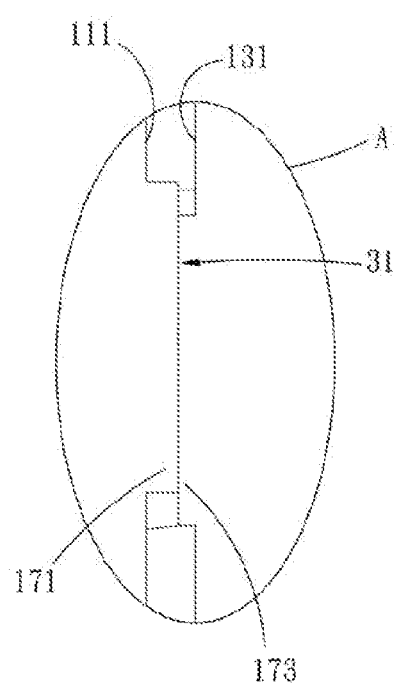
FIG. 4 is an enlarged view of area A of FIG. 3.

FIG. 3 is a side view of the first embodiment of the scissor mechanism of the present disclosure and FIG. 4 is an enlarged view of area A of FIG. 3. In the present embodiment, two opposite first side surfaces 111 of the inner arm 11 respectively comprise a first connecting part 113, and two opposite second side surfaces 131 of the outer arm 13 respectively comprise a second connecting part 133. The inner arm 11 is disposed within the outer arm 13, and the first connecting part 113 is pivotally connected to the corresponding second connecting part 133. An anti-frictional configuration 3 is disposed between each of the two first side surfaces 111 of the inner arm 11 and each of the two second side surfaces 131 of the outer arm 13 corresponding to each of the first side surfaces 111 of the inner arm 11. The anti-frictional configuration 3 is provided with a smooth contact surface 31, and the smooth contact surface 31 is a flat surface. The inner arm 11 and the outer arm 13 are demolded by angle lifting demolding to change the position of the parting line or the burr from demolding, producing smooth contact surfaces between the inner arm 11 and the outer arm, so that the two first side surfaces 111 and the two second side surfaces 131 are free from any parting lines or burrs. By the means described above, which eliminates the parting lines or burrs from two first side surfaces 111 of the inner arm 11 and two second side surfaces 131 of the outer arm 13, the noise from rubbing of the parting lines or burrs of two first side surfaces 111 of the inner arm 11 and two second side surfaces 131 of the outer arm 13 can be eliminated during the pivoting of the inner arm 11 and the outer arm 13.

Figure 5:
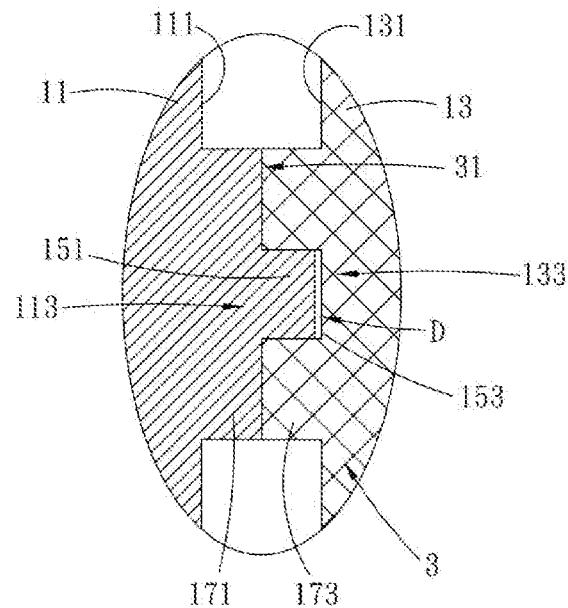
FIG. 5 is a sectional view of the first embodiment of the scissor mechanism of the present disclosure.

FIG. 5 is a sectional view of FIG. 4 and the first embodiment of the scissor mechanism of the present disclosure. In the present embodiment, each of the two anti-frictional configurations 3 comprises a first bump 171 and a second bump 173. A first bump 171 is disposed on each of the two first side surfaces 111, and a second bump 173 is disposed on each of the two second side surfaces 131. A first connecting part 113 is disposed on each of the two first bumps 171, and a second connecting part 133 is disposed on each of the two second bumps 173. A smooth contact surface 31 is provided between each of two first bumps 171 and each of two second bumps 173 corresponding to each of the two first bumps 171. Each of two first connecting part 113 is a shaft 151, and each of two second connecting part 133 is a shaft hole 153. Each of two shafts 151 and each of two shaft holes 153 is pivotally connected. In the present embodiment, in addition to eliminate the noise from rubbing by the two smooth contact surfaces 31 disposed between each of the two first bumps 171 and each of the two second bumps 173 corresponding to each of the two first bumps 171, the relative arrangement of each of the two first bumps 171 and each of the two second bumps 173 corresponding to each of the two first bumps 171 can also reduce the size of the contact area between each of the two first side surfaces 111 of the inner arm 11 and each of the second side surfaces 131 corresponding to each of the two first side surfaces 111 of the outer arm 13. That is, the rubbing noise is eliminated by effectively reducing the size of the contact surface between the inner arm 11 and the outer arm 13.

Therefore, each of the two first connecting part 113 of the inner arm 11 is a shaft 151 and each of the two second connecting part 133 of the outer arm 13 is a shaft hole 153. Each of the two shafts 151 and each of the two shaft holes 153 corresponding to each of the two shafts 151 are pivotally connected. Each of the two second connecting part 133 is a shaft hole 153 if each of the two first connecting part 133 is a shaft 151. Each of the two connecting part 133 is a shaft 151 if each of the two first connecting part 133 is a shaft hole 153. The present disclosure does not limit the positional interchange between a shaft 151 and a corresponding shaft hole 153.

Moreover, a gap D (referring to FIG. 5) exists between the end surface of each of the two shafts 151 and a surface of the shaft hole corresponding to each of the two shafts 151 perpendiculars to the axis of each of the two shafts 151, and the gap D is less than or equal to 0.1 mm. Namely, the shape of the shaft hole 153 adapts to the shaft 151 passing through the shaft hole 153. The gap between the end surface of each of the two shafts 151 and the bottom surface of each of the two shaft holes 153 corresponding to each of the two shafts 151 is 0.1 mm or less. Limiting the gap between the end surface of each of the two shafts 151 and the bottom surface of each of the two shaft holes 153 corresponding to each of the two shafts 151 can reduce the rocking of the inner arm 11 and the outer arm 13 when the inner arm 11 is combined with the outer arm 13. In the present embodiment, the gap between the inner arm 11 and the outer arm 13 can properly reduced to eliminate the rocking when the scissor mechanism made of inner arm 11 and the outer arm 13 is actuated.

Figure 6:
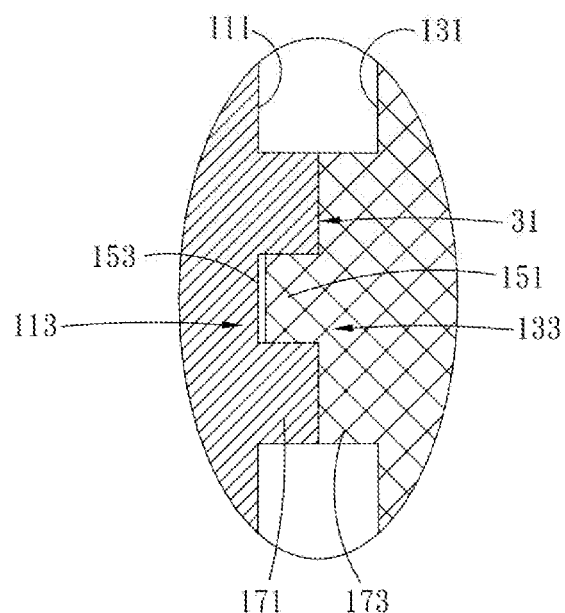
FIG. 6 is a sectional view of the second embodiment of the scissor mechanism of the present disclosure.

FIG. 6 is a sectional view of the second embodiment of the scissor mechanism of the present disclosure. The present embodiment differs from the first embodiment upon the position where the two shafts 151 and the two shaft holes 153 are disposed. In the present embodiment, each of the two shafts 151 is disposed on each of the two second bumps 173 corresponding to each of the two shafts 151, and each of the two shaft holes 153 is disposed on each of the two first bumps 171 corresponding to each of the two shaft holes 153. Each of the two shafts 151 is pivotally connected to each of the two shaft holes 153 corresponding to each of the two shafts 151.

Figure 7:
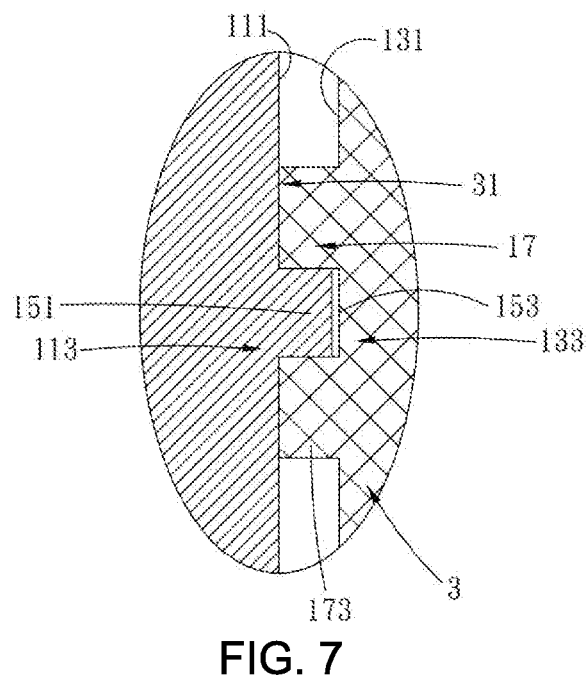
FIG. 7 is a sectional view of the third embodiment of the scissor mechanism of the present disclosure.

FIG. 7 is a sectional view of the third embodiment of the scissor mechanism of the present disclosure. The present embodiment differs from the first embodiment in that a bump is only disposed on one side surface. Each of the anti-frictional configuration 3 comprises a bump 17 disposed on each of the first side surfaces 111 or on each of the two second side surfaces 131. On the end surface of a bump 17 a smooth contact surface 31 is comprised. Each of the two first connecting part 113 or each of the two second connecting part 133 is disposed on the bump 17. In the present embodiment, each of the two second side surfaces 131 comprises a second bump 173. A shaft 151 is disposed on each of the two first side surfaces 111, and a shaft hole 153 is disposed on a second bump 173 of each of the two second side surfaces 131. Each of the two shafts 151 is pivotally connected to a shaft hole 153 corresponding to the shaft 151. A smooth contact surface 31 is provided between the end surface of each of the second bumps 173 and each of the two first side surfaces 111 contacting with the end surface of each of the second bumps 173.

Figure 8:
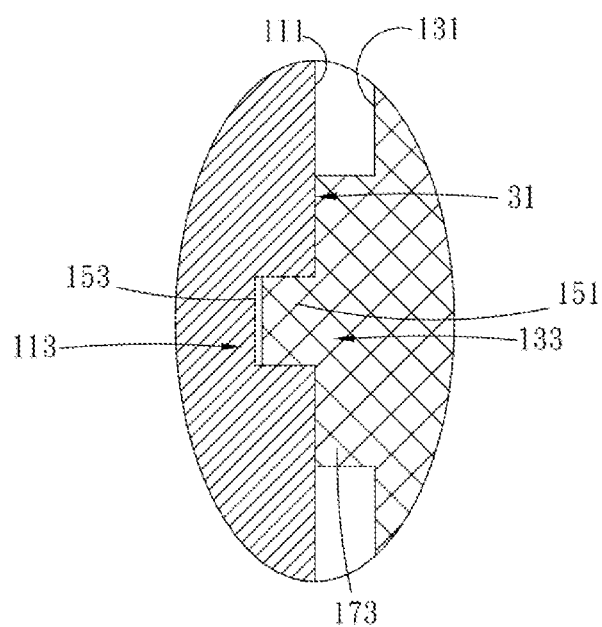
FIG. 8 is a sectional view of the fourth embodiment of the scissor mechanism of the present disclosure.

FIG. 8 is a sectional view of the fourth embodiment of the scissor mechanism of the present disclosure. The present embodiment differs from the third embodiment upon the position where the two shafts 151 and the two shaft holes 153 are disposed. In the present embodiment, a shaft hole 153 is disposed on each of the two first side surfaces 111, and a shaft 151 is disposed on a second bump 173 of each of the two second side surfaces 131. Each of the two shafts 151 is pivotally connected to each of the two shaft holes 153 corresponding to each of the two shafts 151.

Figure 9:
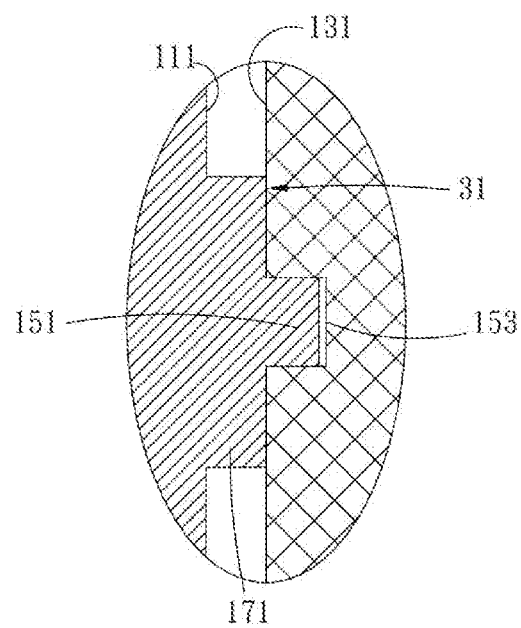
FIG. 9 is a sectional view of the fifth embodiment of the scissor mechanism of the present disclosure.

FIG. 9 is a sectional view of the fifth embodiment of the scissor mechanism of the present disclosure. The present embodiment differs from the first embodiment upon the position of bumps. In the present embodiment, each of the first side surfaces 111 comprises a first bump 171, and a shaft 151 is disposed on a first bump 171 of each of the two first side surfaces 111. A shaft hole 153 is disposed on each of the two second side surfaces 131, and each of the two shafts 151 is pivotally connected to each of the two shaft holes 153 corresponding to each of the two shafts 151. A smooth contact surface 31 is provided in between the end surface of each of the first bumps 171 and each of the two second side surfaces 131 contacting with the end surface of each of the first bumps 171.

Figure 10:
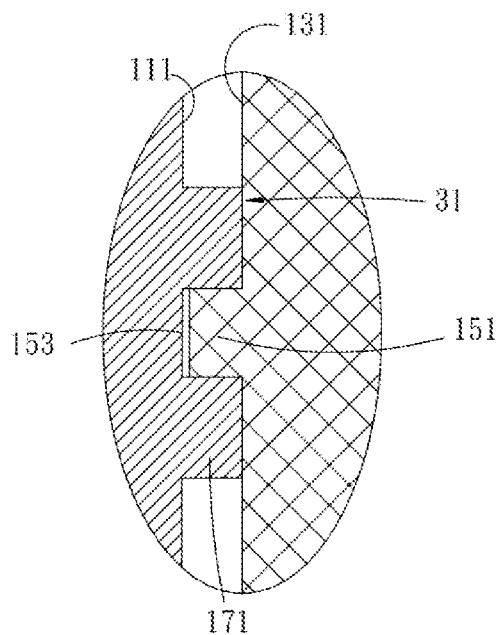
FIG. 10 is a sectional view of the sixth embodiment of the scissor mechanism of the present disclosure.

FIG. 10 is a sectional view of the sixth embodiment of the scissor mechanism of the present disclosure. The present embodiment differs from the fifth embodiment upon the position where the two shafts 151 and the two shaft holes 153 are disposed. In the present embodiment, a shaft hole 153 is disposed on a first bump 171 of each of the two first side surfaces 111, and a shaft 151 is disposed on each of the two second side surfaces 131. Each of the two shafts 151 is pivotally connected to each of the two shaft holes 153 corresponding to each of the two shafts 151.

Figure 11:
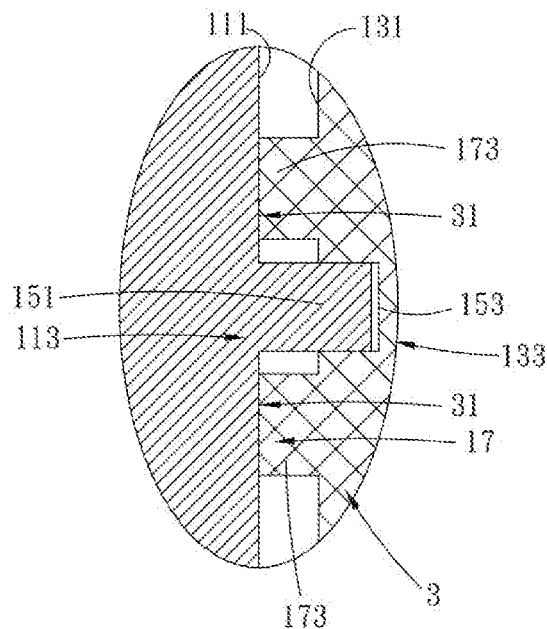
FIG. 11 is a sectional view of the seventh embodiment of the scissor mechanism of the present disclosure.

FIG. 11 is a sectional view of the seventh embodiment of the scissor mechanism of the present disclosure. The present embodiment differs from the third embodiment upon the position where the two shafts 151 and the two shaft holes 153 are disposed. Each of the anti-frictional configuration 3 comprises a bump 17 disposed on each of the two first side surfaces 111 or on each of the two second side surfaces 131. On the end surface of a bump 17 is a smooth contact surface 31. A first connecting part 113 or a second connecting part 133 is disposed on one side of a bump 17, in which the quantity of bump 17 can be one or more than one. In the present embodiment, each of the two second side surfaces 131 comprises two second bumps 173. A shaft 151 is disposed on each of the two first side surfaces 111, and a shaft hole 153 is disposed between two second bumps 173 of each of the two second side surface 131 corresponding to each of the two first side surfaces 111. Each of the two shafts 151 is pivotally connected to each of the two shaft holes 153 corresponding to each of the two shafts 151. A smooth contact surface 31 is provided between the end surface of two second bumps 173 and each of the two first side surfaces 111 contacting with the end surface of two second bumps 173. The two second bumps 173 can simultaneously stabilize the rocking of the inner arm 11 and the outer arm 13.

Figure 12:
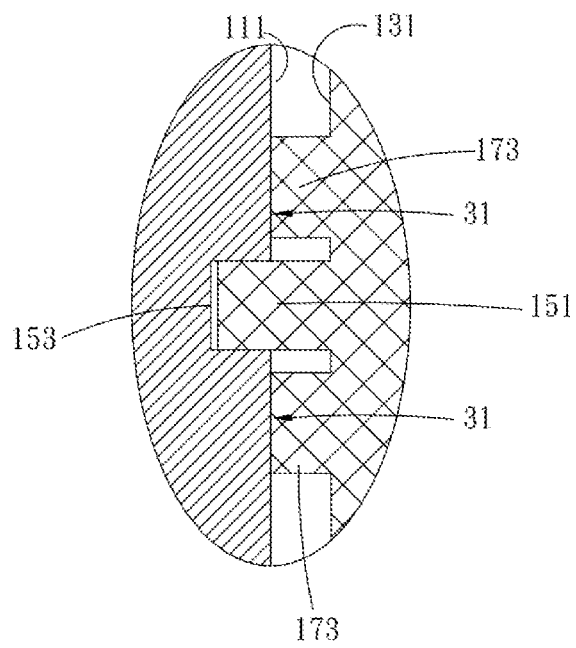
FIG. 12 is a sectional view of the eighth embodiment of the scissor mechanism of the present disclosure.

FIG. 12 is a sectional view of the eighth embodiment of the scissor mechanism of the present disclosure. The present embodiment differs from the seventh embodiment upon the position where the two shafts 151 and the two shaft holes 153 are disposed. In the present embodiment, a shaft hole 153 is disposed on each of the two first side surfaces 111, and a shaft 151 is disposed between two second bumps 173 of each of the two second side surfaces 131 corresponding to each of the two first side surfaces 111. Each of the two shafts 151 is pivotally connected to each of the two shaft holes 153 corresponding to each of the two shafts 151.

Figure 13:
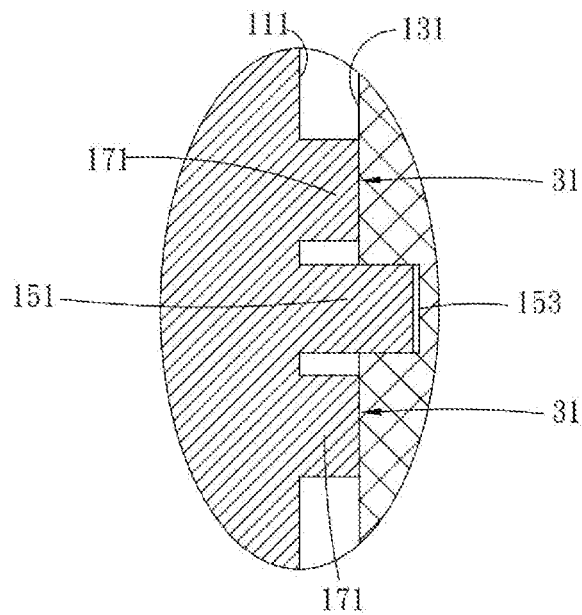
FIG. 13 is a sectional view of the ninth embodiment of the scissor mechanism of the present disclosure.

FIG. 13 is a sectional view of the ninth embodiment of the scissor mechanism of the present disclosure. The present embodiment differs from the seventh embodiment upon the position of bumps. In the present embodiment, each of the two first side surfaces 111 comprises two first bumps 171. A shaft 151 is disposed between two first bumps 171 of each of the two first side surfaces 111, and a shaft hole 153 is disposed on each of the two second side surfaces 131. Each of the two shafts 151 is pivotally connected to each of the two shaft holes 153 corresponding to each of the two shafts 151. A smooth contact surface 31 is provided in between the end surface of two first bumps 171 and each of the two second side surfaces 131 contacting with the end surface of two first bumps 171. The two first bumps 171 can simultaneously stabilize the rocking of the inner arm 11 and the outer arm 13.

Figure 14:
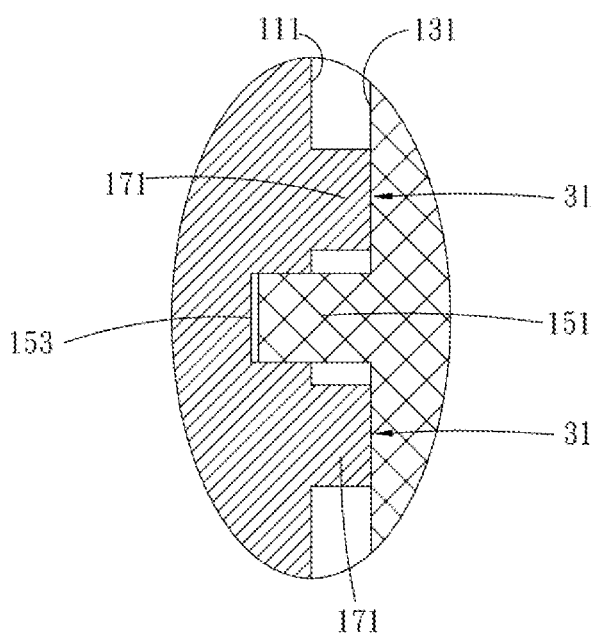
FIG. 14 is a sectional view of the tenth embodiment of the scissor mechanism of the present disclosure.

FIG. 14 is a sectional view of the tenth embodiment of the scissor mechanism of the present disclosure. The present embodiment differs from the ninth embodiment upon the position where the two shafts 151 and the two shaft holes 153 are disposed. In the present embodiment, a shaft hole 153 is disposed between two bumps 17 of each of the two first side surfaces 111, and a shaft 151 is disposed on each of the two second side surfaces 131 corresponding to each of the two first side surfaces 111. Each of the two shafts 151 is pivotally connected to each of the two shaft holes 153 corresponding to each of the two shafts 151.

Figure 15:
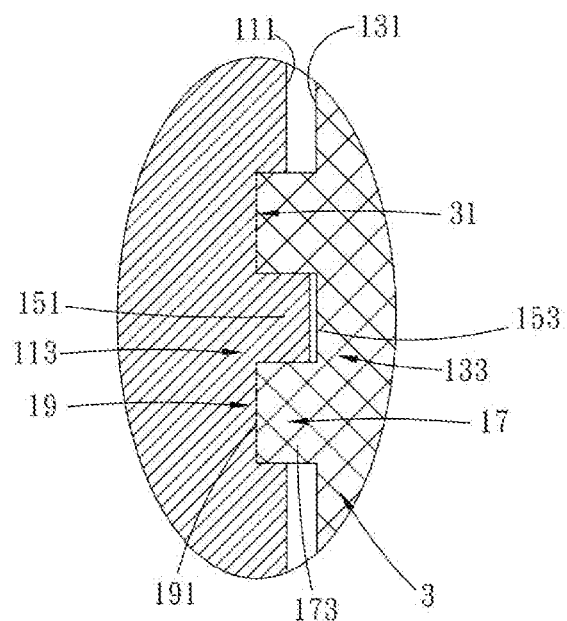
FIG. 15 is a sectional view of the eleventh embodiment of the scissor mechanism of the present disclosure.

FIG. 15 is a sectional view of the eleventh embodiment of the scissor mechanism of the present disclosure. The present embodiment differs from the third embodiment in the existing of two recesses 19 and two bumps 17. Each of the anti-frictional configuration 3 comprises a recess 19 and a bump 17 disposed in the recess 19. A smooth contact surface 31 is provided in between each of the two recesses 19 and each of the two bumps 17 corresponding to each of the two recesses 19. A recess 19 is disposed on each of the two first side surfaces 111, and a bump 17 is disposed on each of the two second side surfaces 131 corresponding to each of the two first side surfaces 111. A first connecting part 113 is disposed on each of the two bumps 17, and a second connecting part 133 is disposed on each of the two recesses 19 corresponding to each of the two bumps 17. In the present embodiment, each of the two first side surfaces 111 comprises a first recess 191, and each of the two second side surfaces 131 comprises a second bump 173. A shaft 151 is disposed in a first recess 191 of each of the two first side surfaces 111, and a shaft hole 153 is disposed on a second bump 173 of each of the two second side surfaces 131 corresponding to each of the two first side surfaces 111. Each of the two shafts 151 is pivotally connected to each of the two shaft holes 153 corresponding to each of the two shafts 151. The bottom surface of each of the two recesses 19 is a flat surface, and a smooth contact surface 31 is provided in between an outer surface of each of the two bumps 17 and an inner surface of each of the two recesses 19.

Figure 16:
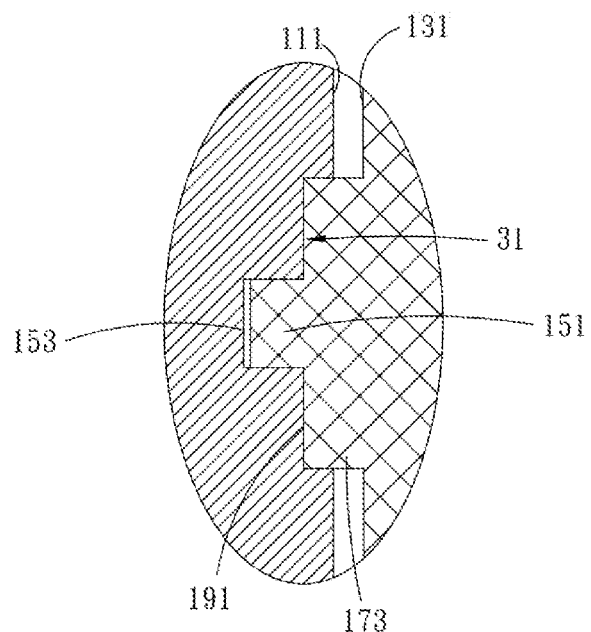
FIG. 16 is a sectional view of the twelfth embodiment of the scissor mechanism of the present disclosure.

FIG. 16 is a sectional view of the twelfth embodiment of the scissor mechanism of the present disclosure. The present embodiment differs from the eleventh embodiment upon the position where the two shafts 151 and the two shaft holes 153 are disposed. In the present embodiment, a shaft hole 153 is disposed in a first recess 191 of each of the two first side surfaces 111, and a shaft 151 is disposed on a second bump 173 of each of the two second side surfaces 131. Each of the two shafts 151 is pivotally connected to each of the two shaft holes 153 corresponding to each of the two shafts 151.

Figure 17:
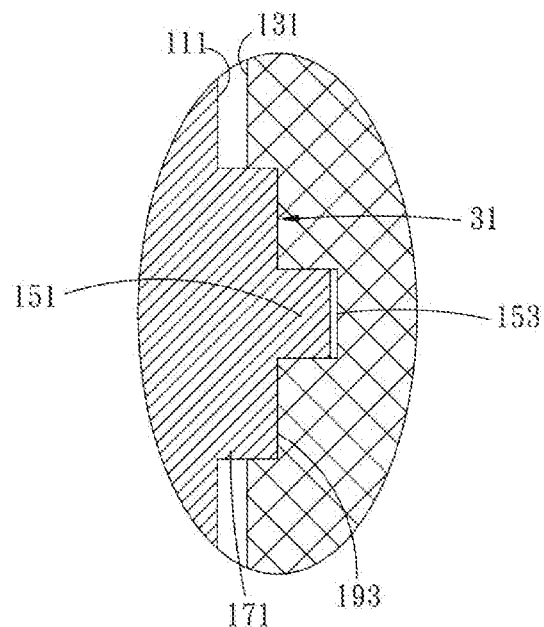
FIG. 17 is a sectional view of the thirteenth embodiment of the scissor mechanism of the present disclosure.

FIG. 17 is a sectional view of the thirteenth embodiment of the scissor mechanism of the present disclosure. The present embodiment differs from the eleventh embodiment in the position where the two recesses 19 and the two bumps 17 are disposed. In the present embodiment, each of the two first side surfaces 111 comprises a first bump 171, and each of the two second side surfaces 131 comprises a second recess 193. A shaft 151 is disposed on a first bump 171 of each of the two first side surfaces 111, and a shaft hole 153 is disposed in a second recess 193 of each of the two second side surfaces 131. Each of the two shafts 151 is pivotally connected to each of the two shaft holes 153 corresponding to each of the two shafts 151, and a smooth contact surface 31 is provided in between an outer surface of each of the two first bumps 171 and an inner surface of each of the two second recesses 193.

Figure 18:
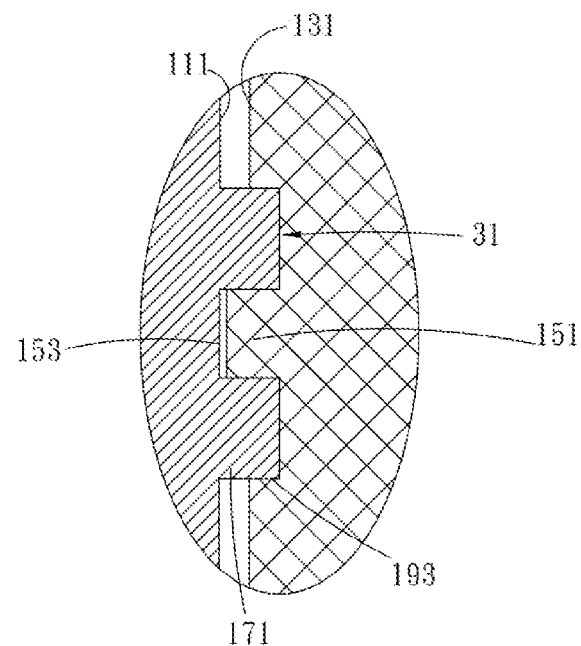
FIG. 18 is a sectional view of the fourteenth embodiment of the scissor mechanism of the present disclosure.

FIG. 18 is a sectional view of the fourteenth embodiment of the scissor mechanism of the present disclosure. The present embodiment differs from the thirteenth embodiment upon the position where the two shafts 151 and the two shaft holes 153 are disposed. In the present embodiment, a shaft hole 153 is disposed on a first bump 171 of each of the two first side surfaces 111, and a shaft 151 is disposed on a second recess 193 of each of the two second side surfaces 131. Each of the two shafts 151 is pivotally connected to each of the two shaft holes 153 corresponding to each of the two shafts 151.

Figure 19:
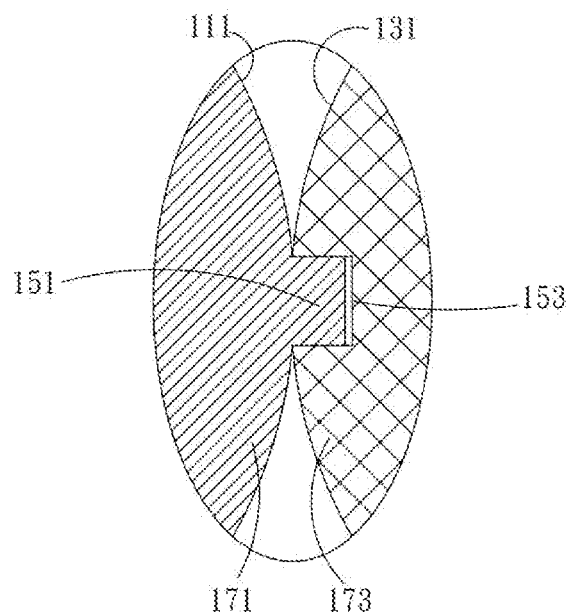
FIG. 19 is a sectional view of the fifteenth embodiment of the scissor mechanism of the present disclosure.

FIG. 19 is a sectional view of the fifteenth embodiment of the scissor mechanism of the present disclosure. As shown in the figure, each of the two smooth contact surface 31 is an arc surface. In the present embodiment, the surfaces of each of the two first bumps 171 and each of the two second bumps 173 corresponding to each of the two first bumps 171 are arc-shaped, possibly to reduce the size of the contact area of each of the two first side surfaces 111 and each of the second side surfaces 131 corresponding to each of the two first side surfaces 111. The friction between each of the two first side surfaces 111 and each of the second side surfaces 131 corresponding to each of the two first side surfaces 111 can be reduced in this way.

Figure 20:
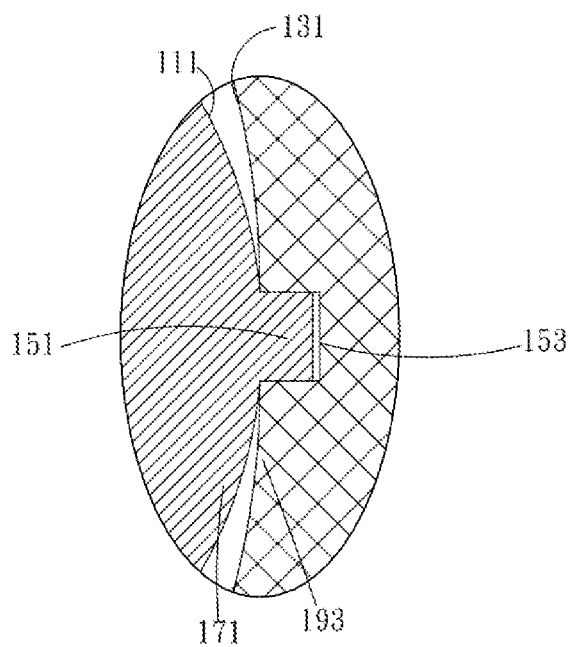
FIG. 20 is a sectional view of the sixteenth embodiment of the scissor mechanism of the present disclosure.

FIG. 20 is a sectional view of the sixteenth embodiment of the scissor mechanism of the present disclosure. The difference between the present embodiment and the thirteenth embodiment is that an outer surface of each of the two first bumps 171 is an arc surface, and an inner surface of each of the two second recesses 193 is an arc surface.

Both each of the two first side surfaces 111 of the inner arm 11 and each of the two second side surfaces 131 corresponding to each of the two first side surfaces 111 of the outer arm 13 have the effect of reducing the noise from rubbing by a smooth contact surface 31 between each of the two first side surfaces 111 and each of the two second side surfaces 131 corresponding to each of the two first side surfaces 111 in embodiments 1 to 16, so details are not described herein.

Figure 21:
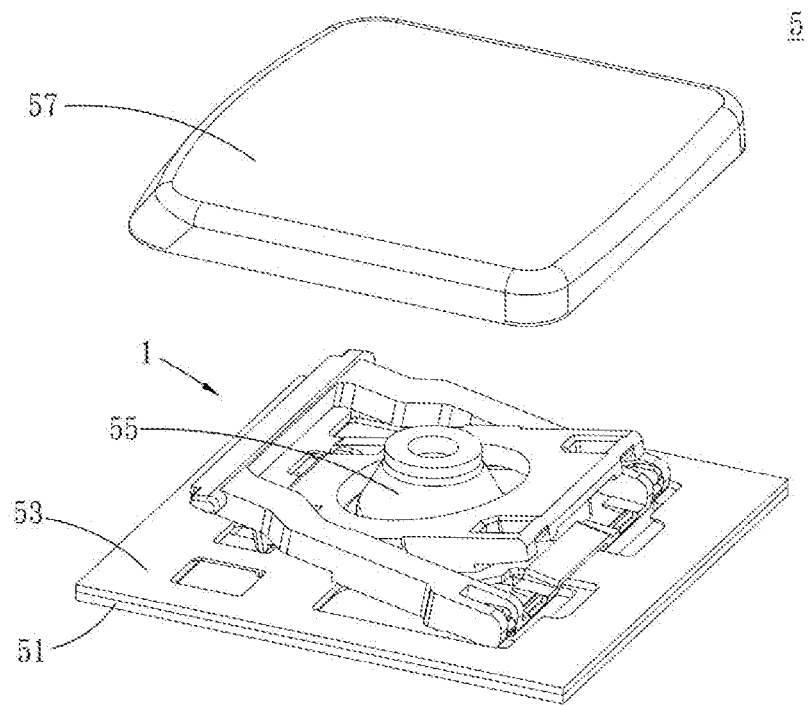
FIG. 21 is an exploded view of the keyswitch of the present disclosure.
Figure 22:
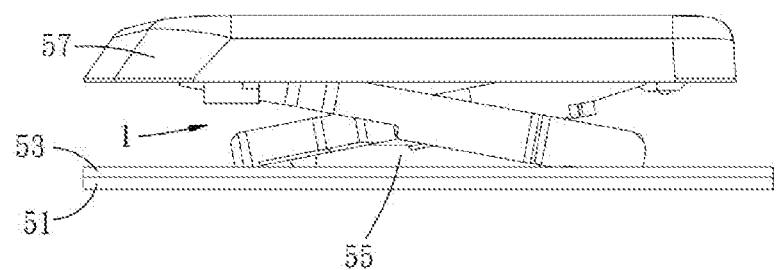
FIG. 22 is a side view of the keyswitch of the present disclosure.

FIG. 21 and FIG. 22 are an exploded view and a side view of the keyswitch of the present disclosure. The present embodiment provides a keyswitch 5 comprising a baseplate 51, a thin film circuit board 53, an elastic body 55, a keycap 57 and a scissor mechanism 1. The thin film circuit board 53 is disposed on the baseplate 51. The elastic body 55 is disposed on the thin film circuit board 53. And the keycap 57 is disposed on the elastic body 55. The scissor mechanism 1 is disposed between the baseplate 51 and the keycap 57. The top end of the scissor mechanism 1 connects to the keycap 57, and the bottom end of the scissor mechanism 1 connects to the baseplate 51 so that the keycap 57 is able to move up and down relative to the baseplate 51.

In summary, the present invention proposed a scissor mechanism and a keyswitch. The frictional force produced by rubbing of the inner arm and the outer arm can be decreased through the anti-frictional configuration so that the noise can be reduced accordingly when the inner arm and the outer arm pivot.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A scissor mechanism disposed between a keycap and a baseplate of a keyswitch, comprising:
    an inner arm, on which two opposite first side surfaces respectively comprise a first connecting part; and
    an outer arm, on which two opposite second side surfaces respectively comprise a second connecting part; the inner arm is disposed within the outer arm; the first connecting parts are pivotally connected to the corresponding second connecting parts;
    wherein an anti-frictional configuration is disposed between each of the two first side surfaces of the inner arm and each of the two second side surfaces of the outer arm corresponding to each of the first side surfaces of the inner arm; the anti-frictional configuration is provided with a smooth contact surface;

wherein each of the two anti-frictional configurations comprises a first bump and a second bump; the first bumps are respectively disposed on the two first side surfaces; the second bumps are respectively disposed on the two second side surfaces; the first connecting parts are respectively disposed on the two first bumps; the second connecting parts are respectively disposed on the two second bumps; a smooth contact surface is provided between each of the two first bumps and each of the two second bumps corresponding to each of the two first bumps.

2. The scissor mechanism according to claim 1, wherein the smooth contact surface is a flat surface or an arc surface.

3. The scissor mechanism according to claim 1, wherein the first connecting parts are shafts; the second connecting parts are shaft holes; the shafts and the shaft holes are pivotally connected.

4. The scissor mechanism according to claim 2, wherein a gap exists between the end surface of the shaft and a surface of the shaft hole perpendicular to the axis of the shaft; the gap is less than or equal to 0.1 mm.

5. A keyswitch, comprising:
a baseplate;
a keycap disposed on the baseplate; and
a scissor mechanism disposed between the keycap and the baseplate, the top end of the scissor mechanism connects to the keycap, and the bottom end of the scissor mechanism connects to the baseplate such that the keycap is able to move up and down relative to the baseplate;

wherein the scissor mechanism comprises an inner arm, on which two opposite first side surfaces respectively comprise a first connecting part; and an outer arm, on which two opposite second side surfaces respectively comprise a second connecting part; the inner arm is disposed within the outer arm; the first connecting parts are pivotally connected to the corresponding second connecting parts;

wherein an anti-frictional configuration is disposed between each of the two first side surfaces of the inner arm and each of the two second side surfaces of the outer arm corresponding to each of the first side surfaces of the inner arm; the anti-frictional configuration is provided with a smooth contact surface;

wherein each of the two anti-frictional configurations comprises a bump disposed on each of the two first side surfaces or each of the two second side surfaces; a smooth contact surface is provided between the end surface of each of the two bumps and each of the two first side surfaces or each of the two second side surfaces corresponding to each of the two bumps; the first connecting parts or the second connecting parts are respectively disposed on each of the two bumps, and wherein the first connecting parts or the second connecting parts are respectively disposed on one side of each of the two bumps.

* * * * *